United States Patent [19]

Nerger et al.

[11] Patent Number: 5,005,889
[45] Date of Patent: Apr. 9, 1991

[54] GRIPPER ASSEMBLY FOR AN INDUSTRIAL ROBOT

[75] Inventors: Klaus K. Nerger, Witten; Hans J. Klein, Iserlohn; Günther Burkart, Herdecke, all of Fed. Rep. of Germany

[73] Assignee: Mannesmann Aktiengesellschaft, Dusseldorf, Fed. Rep. of Germany

[21] Appl. No.: 359,120

[22] Filed: May 31, 1989

[30] Foreign Application Priority Data

Jun. 3, 1988 [DE] Fed. Rep. of Germany ....... 3819302
Jan. 24, 1989 [DE] Fed. Rep. of Germany ....... 3902341

[51] Int. Cl.$^5$ ............................................ B66C 1/62
[52] U.S. Cl. ................................ 294/86.4; 294/119.1; 901/39
[58] Field of Search ................ 294/86.4, 86.41, 119.1, 294/902; 901/25, 30, 31, 32, 36, 39; 414/736

[56] References Cited

U.S. PATENT DOCUMENTS

| | | | |
|---|---|---|---|
| 2,390,293 | 12/1945 | Colson | 294/119.1 X |
| 2,476,249 | 7/1949 | Payne, Jr. | 294/86.4 X |
| 4,238,169 | 12/1980 | De Priester et al. | 294/86.4 X |
| 4,448,405 | 5/1984 | Cipolla | 294/119.1 X |

FOREIGN PATENT DOCUMENTS 606949 11/1978 Switzerland ............ 294/119.1

Primary Examiner—Margaret A. Focarino
Assistant Examiner—Dean J. Kramer
Attorney, Agent, or Firm—Cohen, Pontani & Lieberman

[57] ABSTRACT

An industrial robot gripper assembly includes a pair of spaced apart gripper arms, each of which carries a plurality of workpiece receiving devices. The gripper arms are movable toward and away from each other and at least one of the workpiece receiving devices on each of the gripper arms is movable along an arcuate path so as to bring the receiving devices into appropriate receiving positions for gripping engagement with a workpiece.

12 Claims, 3 Drawing Sheets

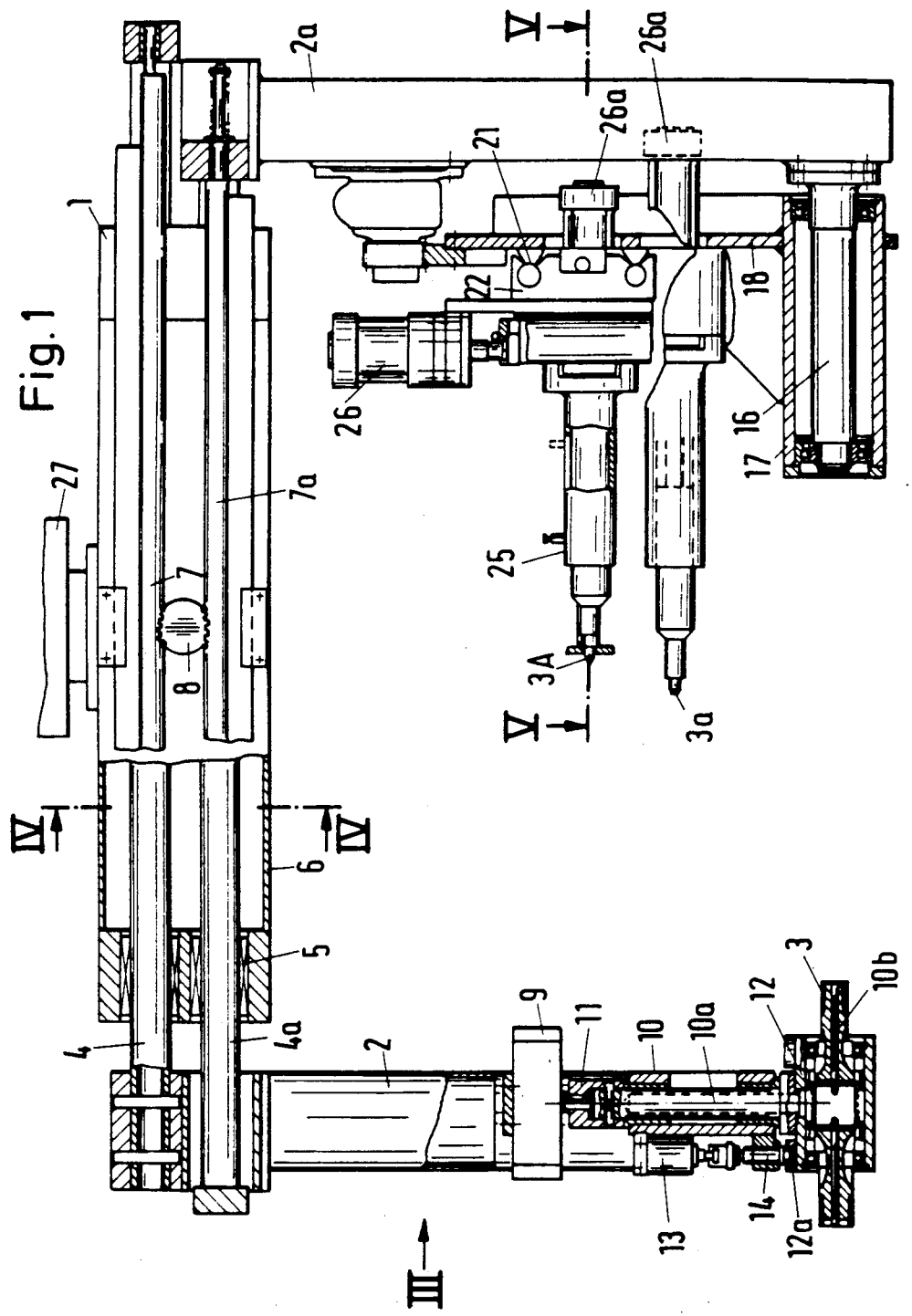

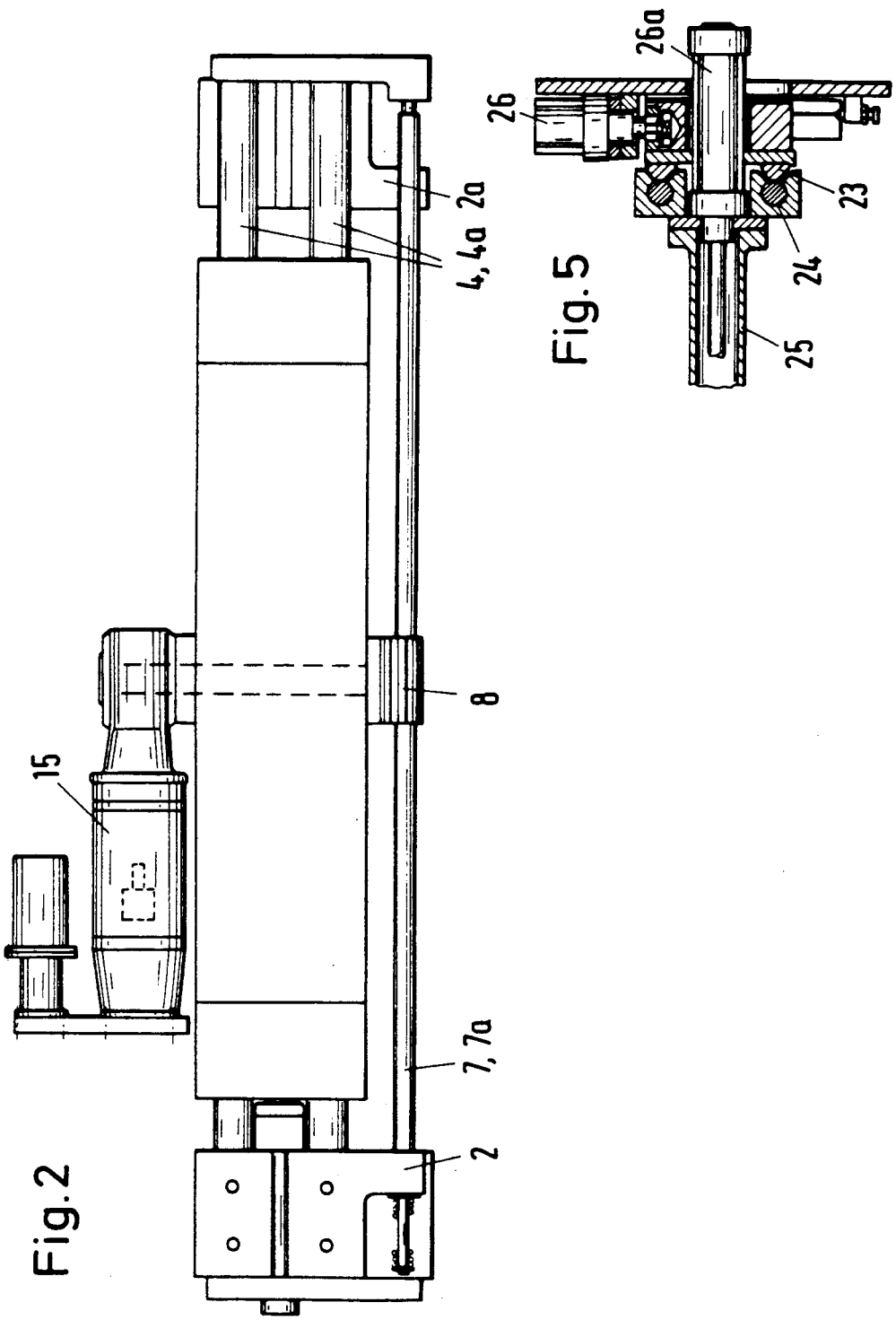

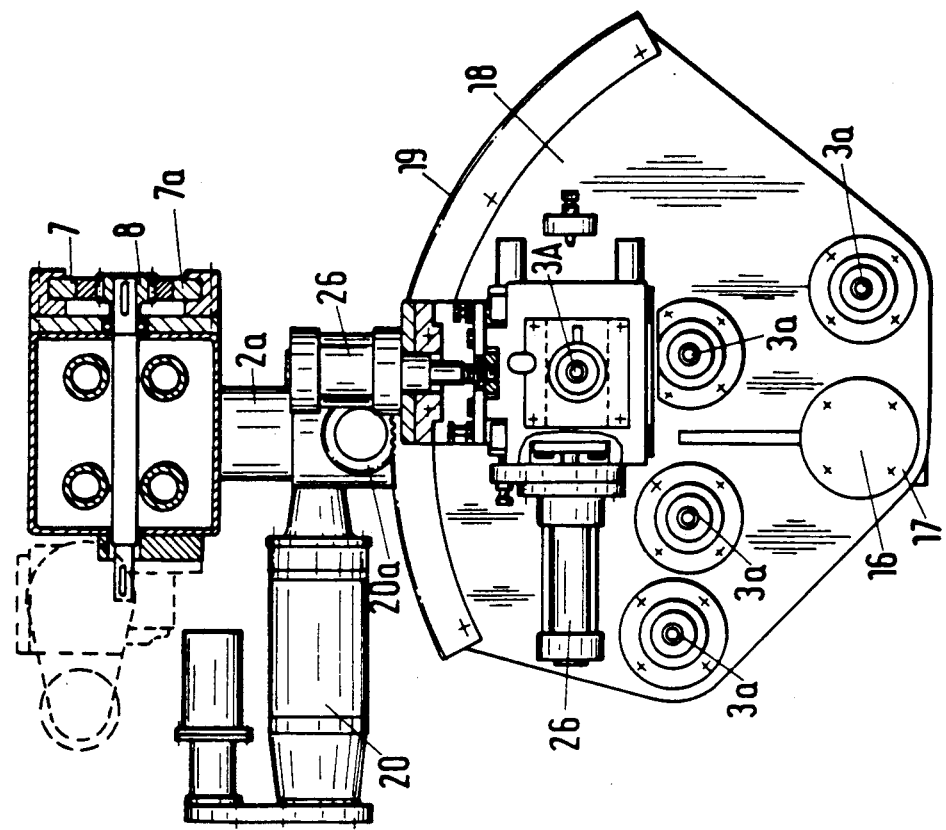
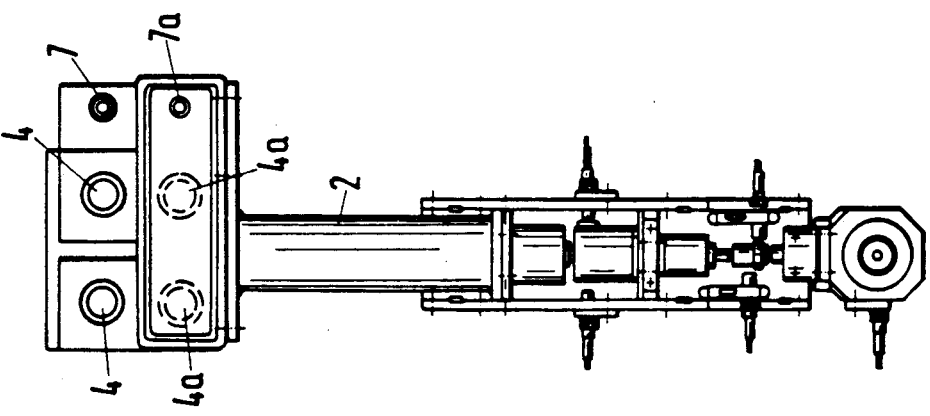

GRIPPER ASSEMBLY FOR AN INDUSTRIAL ROBOT

FIELD OF THE INVENTION

The present invention relates to a gripper assembly for an industrial robot having at least a pair of gripper arms which are displaceable relative to each other and which carry receiving devices for workpieces with which they operatively engage.

BACKGROUND OF THE INVENTION

Robot gripper assemblies which include arms that carry workpiece-receiving devices are known in the art. Federal Republic of Germany Patent No. 3,517,460 discloses V-shaped receiving devices which are oriented toward each other to enable the moving of round parts. For gripping on or under other similar parts the configurations of the receiving devices could be specially adapted to correspond to the particular part or workpiece shapes. With the increasing use of industrial robots has come an attendant demand for receiving devices which will also accommodate workpieces of irregular surface shapes; such irregular shapes are particularly difficult to grasp by heretofore known industrial robots.

SUMMARY OF THE INVENTION

It is accordingly an object of the present invention to provide a gripper assembly for an industrial robot capable of grasping or otherwise engaging workpieces having irregular surfaces such, for example, as housings of gears and motors.

This object is achieved by providing each gripper arm of an industrial robot with a plurality of receiving devices which can be selectively brought into receiving position with respect to the workpiece by moving or rotating the receiving devices about axis-defining shafts or otherwise about arcuate courses or paths. The receiving devices of the plural gripper arms, disposed in confrontingly opposed relation, are brought into appropriate receiving positions in accordance with the shape of the workpiece to be lifted and are then displaced toward each other until they engage or rest against the desired portion or location on the workpiece. Thus, for example, one receiving device may be introduced into a bore hole or can grasp a screw of the workpiece while an opposite receiving device is brought below a ridge or appendage or other projection on the workpiece so that the gripper dependably grasps or grips under the workpiece for lifting the article from its initial position.

A gripper arm of the invention may, in a preferred form, have a plurality of receiving devices arranged, by way of example, in a star-shaped configuration with respect to each other and which are movable about a generally vertical shaft of a guide into a workpiece-receiving position. These plural receiving devices may be formed having different receiving shapes. The receiving devices may further be arranged on a common holder which is connected by a clutch to an operable motor, the holder having at least a notch positioned for receiving a locking bolt or pin of a short-lift device. The receiving devices may also be so supported on the holder as to enable their selective rotation about their respective longitudinal shafts for enabling the receiving devices to follow the turning movements of an oppositely disposed receiving device or workpiece.

The receiving devices carried on the other, oppositely disposed gripper arm may be arranged on a support plate disposed for movement about a horizontally-oriented stub shaft; for this purpose, one side or portion of the support plate may include an arcuate segment with a gear rim for receiving the rotatable pinion of a motor. The receiving devices on the support plate may be mounted for displacement toward other devices on the support plate so that one or more of the receiving devices reliably grips below or at a lower portion of the workpiece. In order to reduce the number of receiving devices and nevertheless retain the ability to cover substantially all possible positions, at least one of the receiving devices may be mounted for relative displacement in two directions parallel to the support plate.

To accommodate rough adjustment of the gripping width, the opposed arms of the industrial robot are connected to guide rods which are arranged substantially perpendicular to the arms and are guided in a central frame of the robot. The frame also includes a pair of toothed racks for engagement with a motor-driven gear by which relative movement of the arms toward and away from each other is effected. To prevent the workpiece from being forced out of contact or engagement with the receiving devices upon striking an obstacle, the central frame of the gripper assembly can be connected, by way of an anti-collision device, to the end of a gripper arm.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to appended claims.

BRIEF DESCRIPTION OF THE DRAWINGS

In the drawings, wherein similar reference characters denote similar elements throughout the several views;

FIG. 1 is a front view, partly in section, of a gripper assembly for an industrial robot in accordance with the present invention;

FIG. 2 is a top plan view of the gripper assembly of FIG. 1;

FIG. 3 is a side view of the gripper assembly of FIG. 1, seen from the direction X in FIG. 1;

FIG. 4 is a sectional view taken along the lines IV—IV in FIG. 1; and

FIG. 5 is an enlarged sectional view taken along the lines V—V in FIG. 1.

DETAILED DESCRIPTION OF THE PREFERRED EMBODIMENT

As perhaps best seen in FIGS. 1 and 3, the industrial robot gripper assembly of the invention includes a frame 1 which carries a pair of substantially horizontal and closely spaced apart upper guide pipes 4 and a pair of similarly horizontal and spaced apart lower guide pipes 4a. The upper pipes 4 are guided for longitudinal movement in bushings 5 of a central frame 6. A first substantially vertical gripper arm 2 depends from the upper pipes 4 and carries a plurality of workpiece receiving devices or points 3. A second substantially vertical gripper arm 2a depends from the lower pipes 4a and carries a plurality of workpiece receiving devices or points 3a, 3A. The relative positions of the receiving points 3a, 3A in the embodiment of the invention herein disclosed is illustrated in FIG. 4.

Mutually toothed racks 7, 7a are disposed substantially adjacent the upper and lower guide pipes 4, 4a. Racks 7, 7a are concurrently driven through oppositely-directed relative longitudinal movements by an interposed gear wheel 8. Wheel 8 is rotated through selective operation of a motor 15 (FIG. 2). Thus, as the motor 15 is operated to rotate gear wheel 8, the racks 7, 7a are relatively moved, as are the guide pipes 4, 4a, so as to selectively adjust the distance or spacing between the opposed gripper arms 2, 2a.

In a preferred form of the invention, the first gripper arm 2 carries, at or proximate its free end, a workpiece receiving point 3, which may be arranged, in the manner of a turret, in several positions, for example two, three, four or six, each having oppositely-directed pairs of receiving points 3 of different shape, by way of example, an internal hexagon. In order to enable controlled selection of any one of the plural receiving points for engagement with a workpiece, the turret-like holder 12 is carried on the end of a shaft 10a which is located within a guide 10 and is operably connected for rotation to a motor 9 through a clutch 11. A short-stroke cylinder 13 carries a locking bolt 14 which is reciprocatable by operation of the cylinder 13 for engagement in any of a plurality of recesses 12a in the holder 12 for controllably securing the holder or turret in any of its rotative positions or orientations and thereby enabling positive retention of the position of a particular receiving point 3 for engagement with a workpiece. One or more of the receiving points 3 is also preferably mounted in the holder 12 for selective rotation of the point 3 about its longitudinal axis 10b.

The second gripper arm 2a carries, at or proximate its free end, a substantially horizontal stub shaft 16 for a bearing bushing 17 and a support plate 18 from which the receiving points 3a, 3A depend. The shape of the supporting plate 18 in the specific embodiments of the invention herein disclosed is seen in FIG. 4. Plate 18 includes, along its top edge in the illustrated embodiment, a gear rim 19 that is engaged by a pinion 20a of a motor 20. The motor 20 is operable to move or swing the plate 18 through an arc defined about the stub shaft 16 and thereby enable at least two of the receiving points 3a, 3A to be brought into appropriate positions for gripping a given workpiece in such a way that the workpiece can be elevated without tilting the same.

The receiving point 3A is moveable to selectable positions within a plane that lies substantially perpendicular to the extension of the point 3A from the support plate 18 so as to enable the receiving point 3A to reach, in cooperation with the swinging movement of plate 18 about stub shaft 16, all appropriate positions for engagement with a workpiece. For this purpose, the support plate includes a first linear guide 21 (FIG. 1) for a slide 22, and the slide 22 includes a second linear guide 23 for a slide 24 (FIG. 5). The slide 24, in turn, carries a guide pipe 25 for the receiving point 3A. Selected movements of the slides 22, 24 are effected by operation of stroke cylinders 26. Also provided on support plate 18 are stroke cylinders 26a which ar operable for controlled axial movement or shifting of the receiving point 3A. Of course, those skilled in the art will recognize and appreciate that the support plate may also include or carry a conventional three-jaw chuck.

The frame 1 of the gripper assembly of the invention may also carry, at its top (FIG. 1), a plate 28 for an anti-collision device 27.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A gripper assembly of an industrial robot, comprising:
   a pair of gripper arms disposed for relative movement toward and away from each other, each gripper arm comprising a shaft, said shaft having an axis and said axes extending perpendicularly with respect to each other;
   a plurality of workpiece receiving devices carried on each said shaft for gripping arrangement with a workpiece;
   operable means including said shaft mounting said receiving devices to said gripper arms for selectively moving said receiving devices about said axis so as to bring said receiving devices into receiving positions for engagement with the workpiece; and
   one of said plurality of said receiving devices being arranged in a substantially star-shaped configuration with respect to each other, and one of said gripper arms including a guide for guiding said shaft along a vertical axis and about which axis said receiving devices in said star-shaped configuration are movable so as to bring at least a selected one of said receiving devices into a receiving position for engagement with said workpiece.

2. A gripper assembly in accordance with claim 1, wherein said plural receiving devices in said star-shaped configuration have shapes different from each other.

3. A gripper assembly in accordance with claim 1, said operable means comprising a common holder for and in which the plural receiving devices in said star-shaped configuration are mounted, a motor, and a clutch arranged in said guide and connecting the motor and holder.

4. A gripper assembly in accordance with claim 3, wherein each said receiving device in said holder is mounted for relative rotation about an axis substantially perpendicular to said vertical axis.

5. A gripper assembly in accordance with claim 3, wherein said holder includes a plurality of notches defined therein, said operable means comprising a short-stroke device carrying a reciprocatable locking bolt, said short-stroke device being operable for reciprocating said locking bolt into and out of engagement with selected ones of said notches.

6. A gripper assembly in accordance with claim 1, said operable means comprising a support plate, said shaft connecting said support plate to one of said gripper arms for arcuate movement of said support plate about said shaft, at least some of said workpiece receiving devices being carried on said support plate and said shaft being arranged substantially perpendicular to the extension of said one gripper arm.

7. A gripper assembly in accordance with claim 6, wherein a plurality of receiving devices carried on the other of said gripper arms are mounted for displacement toward said receiving devices carried on said support plate.

8. A gripper assembly in accordance with claim 7, at least one of said receiving devices carried by said support plate being mounted for selected displacement in two directions substantially parallel to the support plate.

9. A gripper assembly in accordance with claim 7, said operable means further comprising first and second slides and first and second linear guides displaceably engageable with said slides, said support plate and at least one of said receiving devices carried on said support plate being supportedly connected by said slides and linear guides.

10. A gripper assembly in accordance with claim 6, wherein said support plate includes a gear rim along an arcuate segment of said support plate, and said operable means further comprising a pinion engaging said gear rim and a motor connected to said pinion for rotating the pinion and thereby driving said support plate through said arcuate course.

11. A gripper assembly in accordance with claim 1, further comprising a central frame including bushings, guide bars longitudinally movable through said bushings and connected to said gripper arms, gear racks connected to said guide bars, a gear wheel movably engaging said gear racks, and a motor connected to said gear wheel and operable for rotating said gear wheel and thereby effecting relative movement of said gear racks and, correspondingly, of said guide bars to selectively move said gripper arms toward and away from each other.

12. A gripper assembly in accordance with claim 1, further comprising a central frame and an anti-collision device connecting said central frame to an end of one of said gripper arms.

* * * * *